(12) United States Patent
Rumbaut

(10) Patent No.: US 8,329,243 B2
(45) Date of Patent: Dec. 11, 2012

(54) PROCESS AND PRODUCT PRODUCED BY THE PROCESS

(75) Inventor: Luc Joseph Paul Antonie Marie Rumbaut, Wieze (BE)

(73) Assignee: Barry Callebaut AG, Zurich (CH)

(*) Notice: Subject to any disclaimer, the term of this patent is extended or adjusted under 35 U.S.C. 154(b) by 311 days.

(21) Appl. No.: 12/669,943

(22) PCT Filed: Jul. 17, 2008

(86) PCT No.: PCT/EP2008/005856
§ 371 (c)(1),
(2), (4) Date: Jan. 20, 2010

(87) PCT Pub. No.: WO2009/012928
PCT Pub. Date: Jan. 29, 2009

(65) Prior Publication Data
US 2010/0196585 A1 Aug. 5, 2010

(30) Foreign Application Priority Data
Jul. 21, 2007 (GB) .................................. 0714388.6

(51) Int. Cl.
*A23G 1/00* (2006.01)
(52) U.S. Cl. ....................................... 426/631; 426/519
(58) Field of Classification Search .................. 426/631, 426/519
See application file for complete search history.

(56) References Cited

U.S. PATENT DOCUMENTS

| | | | | |
|---|---|---|---|---|
| 2,356,181 A | | 8/1944 | Ruben | |
| 3,663,231 A | * | 5/1972 | Tourell | 99/485 |
| 4,156,743 A | * | 5/1979 | Schmitt | 426/631 |
| 4,440,797 A | * | 4/1984 | Berkes et al. | 426/613 |
| 4,679,498 A | * | 7/1987 | Chaveron et al. | 99/483 |
| 4,746,529 A | * | 5/1988 | Rapp | 426/660 |
| 5,215,771 A | * | 6/1993 | Callebaut et al. | 426/231 |
| 5,320,427 A | * | 6/1994 | Callebaut et al. | 366/151.1 |
| 5,554,409 A | * | 9/1996 | Vezzani | 426/631 |
| 5,676,995 A | * | 10/1997 | Cully et al. | 426/660 |

(Continued)

FOREIGN PATENT DOCUMENTS

CH      EP 1358804   *   5/2003

(Continued)

OTHER PUBLICATIONS

Beckett, S. T, 1994. Industiral Chocolate Manufacture and Use. Blackie Academic & Professional, New York. p. 83-101.*
Beckett, S.T., "Industrial Chocolate Manufacture and Use," Blackie Academic & Professional: Glasgow, pp. 338-341, (1987).
Niedick, E.A., "Uber ein verbessertes Milchschokolademasseherstellungsverfahren" (= "Improved Method for Manufacture of Milk Chocolate"), *Suesswaren*, vol. 15, No. 3, pp. 91-96, (1971).

(Continued)

Primary Examiner — Carolyn Paden
(74) Attorney, Agent, or Firm — Hoxie & Associates, LLC

(57) ABSTRACT

A process for producing chocolate or a chocolate-like product comprises: (i) forming a first mixture comprising components of the chocolate or chocolate-like product; (ii) grinding the first mixture in first grinding means; (iii) forming a second mixture comprising components of the chocolate or chocolate-like product; (iv) grinding the second mixture in second grinding means different from the first grinding means; (v) combining the first and second mixtures to form a third mixture; and (vi) conching the third mixture to form the chocolate or chocolate-like product.

28 Claims, 2 Drawing Sheets

U.S. PATENT DOCUMENTS

| | | | |
|---|---|---|---|
| 5,709,903 A | | 1/1998 | St. John et al. |
| 5,945,150 A | | 8/1999 | Lipp |
| 5,989,610 A | * | 11/1999 | Ruzek .......................... 426/281 |
| 5,989,619 A | | 11/1999 | Zumbe et al. |
| 6,221,422 B1 | * | 4/2001 | Kruger et al. ................. 426/631 |
| 6,558,713 B2 | * | 5/2003 | Geyer et al. ................... 424/725 |
| 7,678,407 B2 | * | 3/2010 | Kealey et al. ................. 426/631 |
| 7,736,685 B2 | * | 6/2010 | Parsons et al. ................ 426/631 |
| 7,968,140 B2 | * | 6/2011 | Kealey et al. ................. 426/631 |

FOREIGN PATENT DOCUMENTS

| | | |
|---|---|---|
| DE | 37 35 087 | 6/1988 |
| DE | 43 13 149 | 10/1994 |
| EP | 1 358 804 | 11/2003 |
| EP | 1 733 625 | 12/2006 |
| HU | 42925 | 9/1987 |
| WO | WO 2004/000028 | 12/2003 |

OTHER PUBLICATIONS

Reudenbach, R., "Prallzerkleinerung in der Kakao—und Schokoladenindustrie" (= "Impact milling in the cocoa and chocolate industry"), *Kakao + Zucker*, vol. 25, No. 10, pp. 459-462, 464, (1973).

Simon, E.J., "Zerkleinerung bei der schokoladen-herstellung—getrennte oder gemeinsame vermahlung?" *Rev. Int. Choc.*, vol. 24, No. 4, pp. 140-155, (1969).

* cited by examiner

PROCESS AND PRODUCT PRODUCED BY THE PROCESS

CROSS REFERENCE TO RELATED APPLICATIONS

This application is a U.S. National Stage Application under 35 USC §371 of PCT/EP2008/005856, filed Jul. 17, 2008, which claims the benefit of GB patent application no. 0714388.6, filed Jul. 21, 2007 the contents of each of which are incorporated herein by reference.

BACKGROUND OF THE INVENTION

This invention relates to a process for producing chocolate or a chocolate-like product and to the chocolate or chocolate-like product thereby produced.

Many processes are known for producing chocolate and chocolate-like products. Chocolate-like products are materials in which at least a part of the cocoa butter in chocolate is replaced by another fat, such as butterfat or a vegetable fat such as a cocoa butter equivalent (CBE). Processes for producing chocolate and chocolate-like products typically involve dispersing finely ground powders in a fat phase. The finely ground powders may include, for example, cocoa solids, sugar and optionally milk solids. The ingredients that are used are dictated by the nature of the product. Plain chocolate contains cocoa solids but generally does not contain non-fat milk solids, whereas milk chocolate does contain non-fat milk solids and milk fat as additional ingredients. White chocolate is prepared without the addition of cocoa mass or cocoa powder. The fat used to produce the chocolate is typically cocoa butter, optionally at least partly replaced by another fat in chocolate-like products.

In the traditional method for producing chocolate and chocolate-like products, the ingredients are mixed and ground in a refiner or mill to reduce the particle size of the solids. The resulting paste is then conched. Conching is a flavour-developing step which involves the intimate mixing or kneading of the chocolate ingredients and is traditionally carried out at elevated temperatures. During conching, the flavour of the product develops and the desired viscosity is obtained. Typically, the free acid and water content of the chocolate are reduced during conching. Conching is a time-consuming step in the process and typically takes from a few hours to a few days, depending on the product and the equipment used. After conching, the product may be cooled and optionally tempered.

Conching is generally regarded as an essential step in the process in order to develop the flavour and lower the viscosity of the product. However, because it involves maintaining the product at an elevated temperature for a relatively long time, it is energy intensive.

A method and device for producing chocolate with a shortened conching time, or with no conching step, is described in WO 2004/000028. The device uses a premixer which delivers chocolate flakes to a gear pump. The gear pump extrudes the product through small holes in a die plate and the resulting mixture is passed to a pin mixer for homogenization.

Niediek, Süsswaren, 3, 1971, 91-96 discloses a process for making milk chocolate. Reudenbach, Kakao+Zucker, 10, 1973, 459-464 describes a process for producing a milk chocolate.

U.S. Pat. No. 4,679,498 describes an extrusion process for preparing a chocolate paste.

U.S. Pat. No. 5,945,150 discloses a process for manufacturing chocolate in which a paste is milled and conched before being transferred to a high shear mixer for final liquefaction of the chocolate paste.

EP-A-1358804 relates to a process for preparing a milk-containing chocolate wherein the milk particles are not refined or are separately refined and added at the conching stage.

DE-A-3735087 describes the manufacture of milk chocolate by mixing dark and light-coloured chocolates.

U.S. Pat. No. 6,221,422 and EP-A-1733625 are other examples of documents that describe the production of chocolate.

There remains a need for processes for making chocolate that can reduce conching times. There is also a need to increase the capacity and/or speed of manufacture of the chocolate making process. In particular, there is a need to optimise the use and/or capacity of existing equipment, such as five roller refiners.

BRIEF SUMMARY OF THE INVENTION

According to the invention, there is provided a process for producing chocolate or a chocolate-like product comprising:
(i) forming a first mixture comprising components of the chocolate or chocolate-like product;
(ii) grinding the first mixture in first grinding means;
(iii) forming a second mixture comprising components of the chocolate or chocolate-like product;
(iv) grinding the second mixture in second grinding means different from the first grinding means;
(v) combining the first and second mixtures to form a third mixture; and
(vi) conching the third mixture to form the chocolate or chocolate-like product.

Also provided by the invention are chocolate and chocolate-like products made according to the process of the invention.

DETAILED DESCRIPTION OF THE INVENTION

Figure 1:
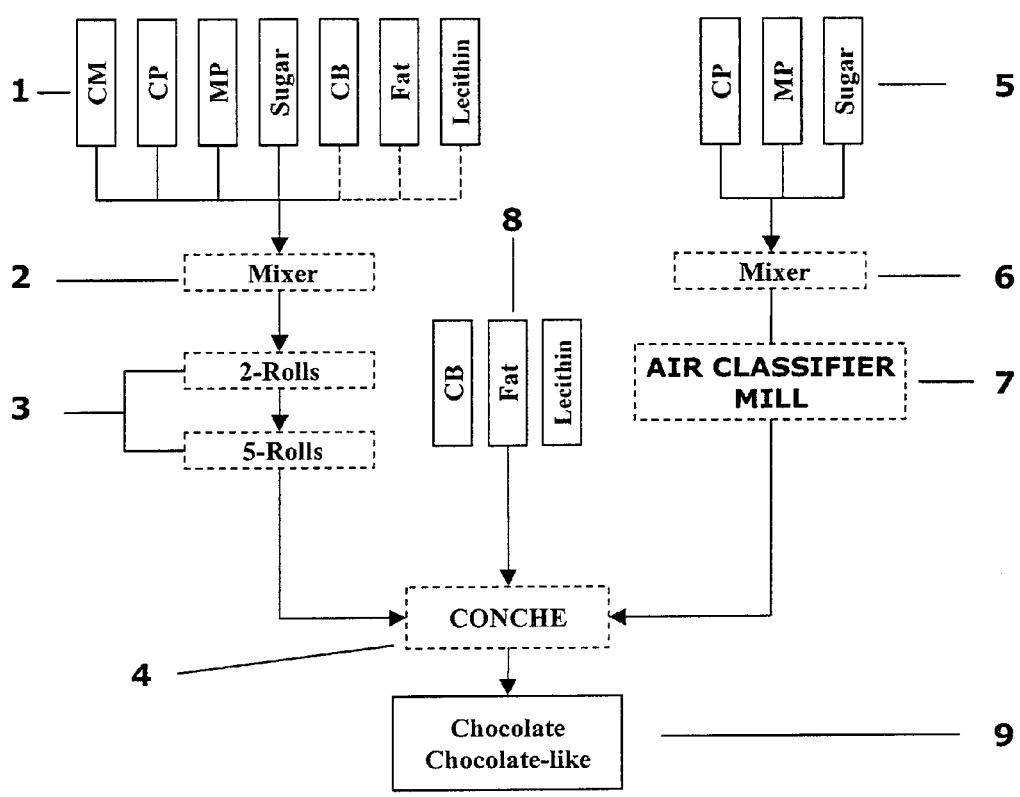
FIG. 1 is a flow diagram schematically showing the process according to the invention.

Steps (i) and (iii) of the process involve the formation of a mixture comprising components of the chocolate or chocolate-like product. Typically, the first and second mixtures will comprise part of the components of the product. By "part of the components", it is meant that not all of the components of the final chocolate or chocolate-like product are present i.e., not all of the components of the final chocolate or chocolate-like product may have been included and/or the components may not have been added in the amounts that are present in the final product.

It has been found that it is possible to produce a chocolate or chocolate-like product by processing some of the components of the product in separate lines or batches, particularly in those parts of the process that involve a reduction in the size of the particles in the various components. Carrying out the process in this way can free up capacity for a roller refiner and a conventional process can be adapted to carry out the process of the invention with relatively low investment costs. It is possible to double the capacity of the process and to match the conching time to the rate of production of the mixture to be conched.

Typically, the components are selected from the group consisting of cocoa materials, sugars, sugar substitutes, milk powders, fat and mixtures thereof. Preferably, the cocoa materials are selected from cocoa powder, cocoa mass, cocoa liquor, cocoa butter, fat and mixtures thereof. Milk powders include, for example, skimmed milk powder, whey powder and derivatives thereof, full cream milk powder and mixtures thereof. Suitable sugars include sucrose, fructose, glucose and dextrose and mixtures thereof (of which sucrose is preferred). Sugar substitutes preferably include inulin, dextrin, isomaltulose, polydextrose and maltitol and mixtures thereof.

Preferably, the first mixture comprises one or more of cocoa powder, milk powder, sugar, cocoa butter, cocoa mass, fat and an emulsifier (e.g., lecithin). Cocoa powder and sugar are used for producing dark chocolate. Cocoa powder, milk powder and sugar are used to produce milk chocolate. Milk powder and sugar are used to produce white chocolate. Preferably, the mixture that is formed in (i) comprises cocoa powder, sugar, cocoa butter and optionally milk powder, fat and lecithin. The first mixture may be formed by a method which comprises a prerefining step.

Preferably, the second mixture comprises at least 50% by weight of sugar (preferably sucrose) and optionally up to 5% by weight of milk powder, preferably from 1 to 4% by weight of milk powder, and optionally up to 5% by weight of cocoa material, preferably from 1 to 4% by weight of cocoa material based on the total weight of the second mixture. The cocoa material is preferably cocoa powder. The amount of sugar in the second mixture is more preferably at least 60% by weight, such as at least 70% by weight, at least 80% by weight or at least 90% by weight. These amounts by weight are based on the weight of the second mixture.

Preferably, the level of fat present in the second mixture is less than 12% by weight, more preferably from 0.5 to 4% by weight. These amounts by weight are based on the weight of the second mixture.

It has been found to be particularly advantageous in the invention to process a mixture comprising the majority of the sugar in the product in a separate batch from the other components of the product. This can double the capacity of the process.

The first and second mixtures are ground in respective first and second grinding means. The term "grinding means", as used herein, preferably refers to any apparatus or device that can reduce the particle size of a particulate-containing material so that the term "grinding" is used in its broadest sense.

Preferably, the first grinding means comprises a roller refiner. More preferably, the roller refiner comprises a five roller refiner. The roller refiner may be a single step but, in one embodiment, may be a two stage refining step. The two stage refining step preferably comprises a first stage comprising refining using a 2-roller mill and a second stage comprising refining using a 5-roller mill. The first mixture is preferably ground to a particle size of less than 80 µm, more preferably less than 50 µm, such as less than 30 µm or less than 25 µm. More preferably, the particle size of the first mixture is from 5 to 50 µm, preferably from 10 to 30 µm, most preferably from 15 to 25 µm.

The second grinding means is different from the first grinding means. Preferably, the second grinding means involves dry milling, more preferably the second grinding means is a classifier mill, such as an air classifier mill. Even more preferably, the air classifier mill is a radial classifier having an air purge system. Air classifier mills that can be used in the invention are commercially available. Suitable apparatus is available from, for example, P.M. Duyvis Machinefabriek BV, The Netherlands. The second mixture is preferably ground to a particle size of less than 80 µm, more preferably less than 50 µm, such as less than 30 µm or less than 25 µm. More preferably, the particle size of the second mixture is from 5 to 50 µm, preferably from 10 to 30 µm, most preferably from 15 to 25 µm. Particle sizes may be determined by the method described in the Examples section below.

In one preferred embodiment of the invention, the first grinding means is a five roller refiner and the second grinding means is an air classifier mill.

Preferably, the weight ratio of the fat in the first mixture to the fat in the second mixture is in the range of from 5:1 to 100:1, more preferably from 10:1 to 75:1, even more preferably from 25:1 to 60:1.

The weight ratio of the (fat in the first mixture):(the fat in the second mixture):(the fat added after (iv) (preferably during (v) and/or (iv))) is preferably (40 to 60):(0.5 to 2):(40 to 60), based on the weight of the fat in the product of (vi).

Preferably the first mixture provides from 20 to 65% by weight, more preferably from 35 to 50% by weight of components based on the weight of the chocolate or chocolate-like product. The second mixture preferably comprises from 20 to 45% by weight of components based on the weight of the final product. The remainder of the components are added after the third mixture has been formed, for example during homogenizing and/or conching.

It will be appreciated that the first and second mixture can be processed in parallel, either continuously or batchwise, before being combined at step (v). It will also be appreciated that steps (i) to (iv) can be carried out in any order, provided that (ii) follows (i) and (iv) follows (iii).

Step (v) of the process involves combining the first and second mixtures to form a third mixture. This step may not be a separate process step but simply requires that the first and second mixtures are combined. The first and second mixtures may, for example, be combined by separate or simultaneous addition to the conch. The third mixture may be formed from the first and second mixtures alone but preferably comprises further ingredients, such as cocoa butter, fat and/or emulsifier, in addition to the first and second mixtures.

The third mixture is conched in step (vi). The process of the invention has the advantage that the time taken for conching can be reduced Step (vi) in the process of the invention involves conching of the third mixture. Preferably, the conching is carried out using a three shaft shear conch or a one shaft plough shear conch. Typically, the conching is carried out at temperature between 50 and 100° C., more preferably from 60 to 90° C. The conching step may be carried out for less than 8 hours, preferably for from 4 to 6 hours.

Ingredients such as one or more fats and emulsifiers may optionally be added before or during conching. Preferably, fat and/or emulsifiers and/or flavouring agents are added to the mixture in the conch. Fats that are preferably added to the conch are selected from the group consisting of cocoa butter, cocoa butter equivalents, butter fat or fractions thereof, palm oil or fractions thereof; coconut or fractions thereof, palm kernel oil or fractions thereof, liquid oils (for example, sunflower oil and/or rapeseed oil), interesterified mixtures of the above fats or fractions or hardened components thereof; or mixtures thereof. The emulsifiers that are preferably added to the conch are selected from the group consisting of lecithin, fractionated lecithin and PGPR or mixtures thereof. Flavouring agents that may be added to the conch are selected from the group consisting of vanilla and caramel or mixtures thereof.

The process of the invention may comprise one or more further steps in addition to (i) to (vi). The process of the invention preferably does not involve a step of extrusion, for example of a component, of a mixture or of a product during the process.

For example, the third mixture produced in (v) may optionally be homogenized prior to conching in (vi). The third mixture may be homogenized with fat. The fat can be partly from the components of the mixture but preferably includes added fat.

Fat is preferably added during homogenization. Preferably, the fat is selected from the group consisting of cocoa butter, cocoa butter equivalents, butter fat or fractions thereof, palm oil or fractions thereof, coconut or fractions thereof, palm kernel oil or fractions thereof, liquid oils (for example, sunflower oil and/or rapeseed oil), interesterified mixtures of the above fats or fractions or hardened components thereof, or mixtures of one or more of these, such as a mixture of cocoa butter and a palm oil fraction.

Other components of the final product may be added to the mixture after step (v) and during homogenization. Emulsifiers, such as lecithin, are preferably added, for example.

During homogenization, the temperature advantageously rises due to the mechanical action of the homogenizer on the mixture. This is advantageous because it allows thorough heating of the mixture directly into the mixture itself (rather than via an outside surface of a container for the mixture) and since it reduces the time taken and/or energy needed to reach the conching temperature. The homogenizing step is preferably carried out such that a temperature rise of at least 10° C., preferably a rise between 20 and 60° C. most preferably a rise between 40 and 50° C. is achieved in the mixture by mechanical input.

Preferably, the homogenizing step is carried out such that the reduction in the particle size during homogenization is less than 25%, more, preferably less than 10%. Most preferably, the homogenizing step is carried out such that the particle size does not change significantly (or at all) during the homogenization step. This means that the particle size of the solids in the final product is dictated solely by the refining step(s).

A preferred homogenizer is a rotor/stator homogenizer. An example of a preferred rotor/stator homogenizer for use in the invention is that described in DE-A-4313149 (Imcatec GmbH; Lipp), the contents of which are incorporated herein by reference. The homogenizer is available commercially from Lipp Mischtechnik GmbH, Mannheim, Germany under the trade name Reflector®. The preferred rotor/stator homogenizer comprises a single-shaft inline mixer which works on the rotor/stator principle. Axially arranged rotor blades intermesh with the toothed rings of the stator. The toothed rings of the stator are preferably peripherally arranged. The toothed rings of the stator together with the ends of the rotors form a shearing zone. The homogenizer preferably comprises a hopper for adding the mixture and a conveying screw for delivering the mixture from the hopper to the rotor/stator elements.

Preferably, homogenization is carried out to give a mixture with a hardness similar to the hardness resulting the shear from at least two hours of traditional conching in a double or single shaft conche. More preferably, homogenization is carried out such that the mixture that is produced, at the temperature at which it leaves the homogenizer, has a penetration value measured with a manual gravity cone penetrometer in the range of from about 5 mm to about 20 mm, more preferably from about 9 mm to about 12 mm. The method for determining penetration values is described in the Examples part of this specification.

After conching, the liquid chocolate or chocolate-like product is cooled, typically after forming into a desired shape. The chocolate or chocolate-like product may comprise one or more food additives that are added prior to cooling, such as biscuit, nuts (whole or pieces), crispies, sponge, wafer or fruit, such as cherries, ginger and raisins or other dried fruit. These additives are normally embedded in the chocolate or chocolate-like product in the final product.

The chocolate or chocolate-like product of the invention may take any suitable form and may, for example, be packaged and sold as a block or a bar. Alternatively or additionally, the chocolate or chocolate-like product of the invention may optionally be filled and may be used as a coating. For example, the chocolate or chocolate-like product may be used in other confectionery and bakery applications, for example as a cake coating or filling, a biscuit coating or filling, a sponge coating or filling or a coating layer for an ice cream.

The chocolate or chocolate-like product of the invention may optionally have further additives added prior to the final use of the product. For example, the fat content may be increased to from 35% to 50% (such as about 45%) by weight by adding fat to the chocolate or chocolate-like product prior to use as an ice cream coating.

The chocolate or chocolate-like product may be used in applications comprising, for example, one or more of moulding, enrobing, dipping, bottoming, filling and panning.

Chocolate-like products include fat-continuous confectionery fillings. Fillings preferably comprise fat, sugar and optionally one or more of dairy powder (including milk powder and/or yoghurt powder), and flavouring agents. Suitable flavouring agents include, but are not limited to, fruit, nut, and vanilla flavourings, fruit powder and pieces, nuts, vanilla, herbs (e.g., mint), herb flavourings, caramel and caramel flavourings. Those skilled in the art are familiar with numerous flavourings than can be used.

The invention also provides chocolate and chocolate-like products made according to the process of the invention. The products may have a fat content of at least 26% by weight, preferably at least 27%, most preferably from 28 to 32% by weight.

The listing or discussion of an apparently prior-published document in this specification should not necessarily be taken as an acknowledgement that the document is part of the state of the art or is common general knowledge.

Figure 2:
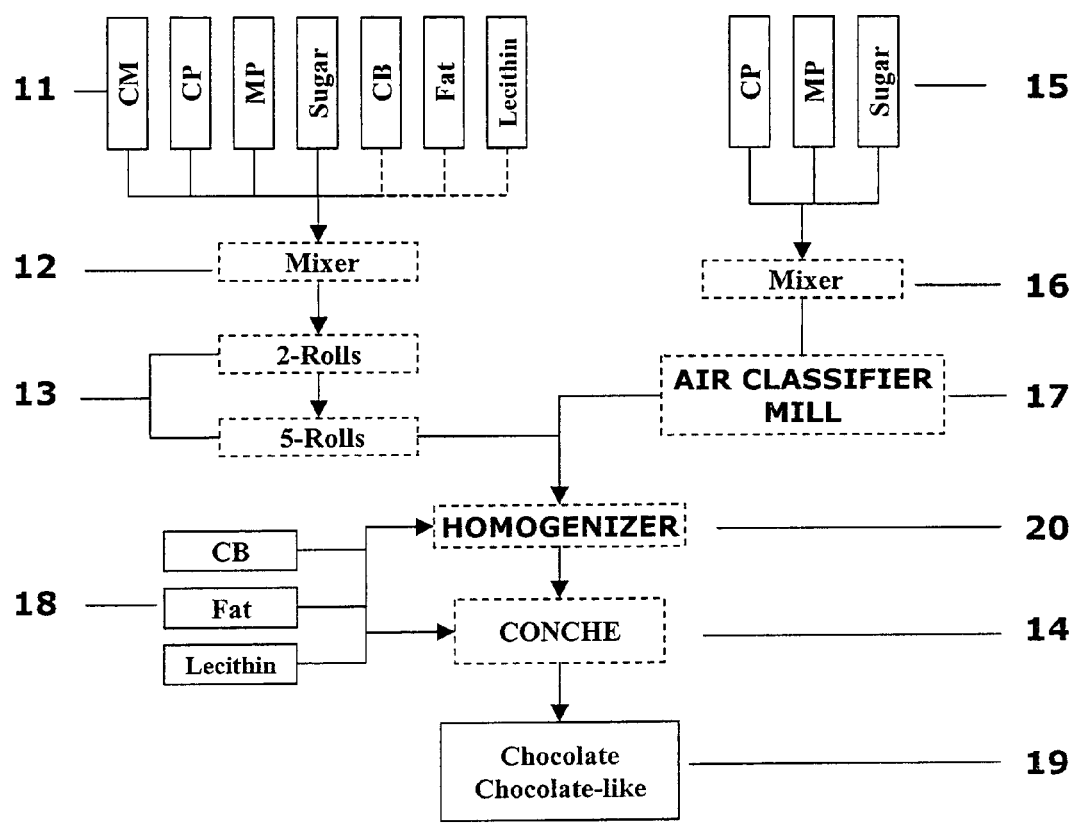
FIG. 2 is a flow diagram schematically showing the process according to the invention that employs a homogenizer.

The invention will now be described, by way of non-limiting example only, with reference to the accompanying drawings, in which:

FIG. 1 is a flow diagram schematically showing a process according to the invention; and FIG. 2 is a flow diagram schematically showing a process according to the invention that employs a homogenizer.

Referring to FIG. 1, ingredients 1 including cocoa powder (CP), cocoa mass (CM), milk powder (MP), sugar, cocoa butter (CB), fat and lecithin are mixed at mixer 2 to form a first mixture. The first mixture comprises up to about 50% by weight of the toal ingredients of the final product. This first mixture passes to two roller refiner and five roller refiner 3 where it is ground. The first mixture then passes to conch 4. Separately, ingredients 5 including cocoa powder (CP), milk powder (MP) and sugar are mixed at mixer 6 to form a second mixture. The second mixture predominantly comprises sugar. The second mixture passes to air classifier mill 7 where it is subjected to grinding. The air classifier mill 7 exerts good control over particle fineness and can be operated at high capacity. After grinding in air classifier mill 7, the second mixture passes to conch 4. Further ingredients 8 including cocoa butter (CB), fat and lecithin are also added to conch 4. The third mixture that is formed from the first and second mixture and the further ingredients in conch 4 is then conched. Liquid chocolate or chocolate-like product 9 exits conch 4.

In FIG. 2, the process is similar to that shown in FIG. 1 but includes a homogenizer. Ingredients 11 including cocoa powder (CP), cocoa mass (CM), milk powder (MP), sugar, cocoa butter (CB), fat and lecithin are mixed at mixer 12 to form a first mixture. Again, the first mixture comprises up to about 50% by weight of the total ingredients of the final product. This first mixture passes to two roller refiner and five roller refiner 13 where it is ground. The first mixture then passes to homogenizer 20. Separately, ingredients 15 including cocoa powder (CP), milk powder (MP) and sugar are mixed at mixer 16 to form a second mixture. The second mixture predominantly comprises sugar. The second mixture passes to air classifier mill 17 where it is subjected to grinding. After grinding in air classifier mill 17, the second mixture passes to homogenizer 20. Further ingredients 18 including cocoa butter (CB), fat and lecithin are also added at homogenizer 20 and to conch 14. Homogenizer 20 brings the mixture to a paste at around the conching temperature. The third mixture that is formed from the first and second mixture and the further ingredients in homogenizer 20 then passes to conch 14 and is conched. Liquid chocolate or chocolate-like product 19 exits conch 14.

The following non-limiting examples illustrate the invention and do not limit its scope in any way. In the examples and throughout this specification, all percentages, parts and ratios are by weight unless indicated otherwise.

EXAMPLES

Procedure for Drop-Cone or Gravity Penetrometer

1. Principle

A polished stainless steel cone of a specific weight and an angle will penetrate a specific distance when allowed to free fall for 5 seconds into the product.

2. Apparatus

Drop-cone Penetrometer with hollow cone, brass with hardened stainless steel tip, 102.5 g (such as the Normalab Analis PENETROMETER—MANUAL MODEL—PETROLATUM—941731)

Metal cylindrical cup (approximately 7.5 cm in diameter and 6.0 cm deep).

3. Procedure

Using a spatula, push the paste into the sample cup, taking care not to trap air bubbles or to work the mixture excessively. Strike over the excess paste with the side of a spatula to give a smooth surface. Position the cup under the penetrometer cone. Lower the cone (using the rack adjustor knob) so that it just touches the surface of the paste. Adjust the pointer to zero. Release the cone for a period of 5 seconds. After the cone has been locked in position lower the dial gauge to the new position of the cone shaft and note the reading to the nearest 0.1 mm. The difference between the readings at the beginning and end of the test is recorded as the cone penetrated. Reading divided by 10 equals the penetration value in mm.

Procedure for Determining Particle Size (Fineness) with Micrometer

1. Principle

A small amount of (diluted) product is placed on the measuring surface of the micrometer. By pressing, an indication of the size of the largest non-compressible particles can be received.

2. Material

Micrometer: precision 1 μm.
Solution A: 50% lecithin+50% sunflower oil

3. Sample Preparation

Liquefy the chocolate or semi-finished products and homogenize.
If the product is not liquid (high viscosity, refiner or chocolate powder), add solution A to dilute it:
    fill half of a cup with the product (weight=+/−10 gram)
    add 2 ml of the solution A with a plastic syringe
    mix thoroughly during 2 minutes with a spatula until a liquid solution.

4. Procedure

Verification:
Make sure the surfaces of the micrometer are clean (otherwise clean with paper).
Slowly rotate the micrometer screw until both surfaces are closed.
Verify the instrument reads zero when closed.
Measurement:
Add one or two drops of warm sample on the fixed micrometer surface.
Slowly rotate the micrometer screw until the ratchet clicks twice.
Take the reading.
Clean the surfaces and repeat the measurement three times.
Make an average of the three readings and express the result in μm.

Example 1

A milk chocolate is produced using the process depicted in FIG. 1.

The chocolate has the following composition.

| Milk chocolate | | % of total weight | % of total weight | % fat at end of stage | % fat on total weight | % fat to total % fat |
|---|---|---|---|---|---|---|
| First mixture | Milk powder | 22.0 | 45.7 | 37.9 | 17.3 | 51.6 |
| | Cocoa liquor | 12.0 | | | | |
| | Cocoa butter | 5.0 | | | | |
| | Sugar | 6.7 | | | | |
| Second mixture | Milk powder | 1.2 | 37.6 | 0.8 | 0.3 | 0.9 |
| | Sugar | 36.5 | | | | |
| Conch filling | Cocoa butter | 11.3 | 11.3 | 30.6 | 16.0 | 47.5 |
| | Lecithin | 0.0 | | | | |
| End conching | Cocoa butter | 4.6 | 5.3 | 33.6 | | |
| | Lecithin | 0.7 | | | | |
| | Vanilla | 0.0 | | | | |
| | Total | 100 | 100 | 33.6 | 33.6 | 100.0 |

The first mixture of full cream milk powder, West Africa cocoa mass and cocoa butter is mixed in a paddle mixer according to the recipe. The second mixture of crystal sugar and full cream milk powder is mixed in a ribbon powder mixer according to the recipe. The first mixture is refined on one two-roll 900 refiner, followed by one five-roll 1300 refiner at a rate of 500 kg per hour in order to obtain a fineness of 18 μm. The second mixture is refined simultaneously on an air classifier mill at a rate of 400 kg per hour and achieves the same fineness of 18 μm. Both flows of refined mixtures come together into a three-shaft 4 tons conch where regularly cocoa butter is added to give the total mass in the conch the required consistency for good dry conching. After 6 hours of dry conching with a maximum temperature of 88° C., the mass is liquefied by addition of lecithin and cocoa butter whereafter in accordance with the recipe vanilla is added. The viscosity measurement gives a Casson viscosity of 2800 mPas at 40° C. and a Casson yield value of 6.0 Pa. Methods for determining viscosity are well known to those skilled in the art and include, for example, the method described in the International Office of Cocoa, Chocolate and Sugar Confectionery, IOCCC method 10.

The analytical and taste results of this product give no significant difference with a reference production performed with the same raw materials, with the advantage that the process could be run on a production line with double the refiner capacity.

Example 2

A milk chocolate is produced using the process depicted in FIG. 2.

The chocolate has the following composition:

| Milk chocolate | | % of total weight | % fat on total weight | |
| --- | --- | --- | --- | --- |
| First mixture | Milk powder | 20.0 | 44.5 | 17.6 |
| | Cocoa liquor | 12.0 | | |
| | Cocoa butter | 5.8 | | |
| | Sugar | 6.7 | | |
| Second mixture | Sugar | 36.6 | 39.9 | 0.8 |
| | Milk powder | 3.3 | | |
| Homogeniser | Cocoa butter | 9.9 | 9.9 | 9.9 |
| End conching | Cocoa butter | 5.0 | 5.7 | 5 |
| | Lecithin | 0.7 | | |
| | Vanilla | 0.01 | | |
| Total | | 100 | 100 | 33.3 |

The first mixture of full cream milk powder, West Africa cocoa liquor and cocoa butter is mixed in a paddle mixer according the recipe. The second mixture of crystal sugar and full cream milk powder is mixed in a ribbon powder mixer according to the above recipe. The first mixture is refined on one two-roll 1000 refiner, followed by one five-roll 1300 refiner at a rate of 500 kg per hour in order to obtain a fineness of 20 μm. The second mixture is refined simultaneously on an air classifier mill at a rate of 400 kg per hour and achieves the fineness of 18 μm. The first and the second mixture are conducted into a rotor stator homogeniser where cocoa butter is dosed so that the both powders are transformed into a resistant paste at an average temperature of 80° C. and a fineness of 18 μm. This blend is fed into a three-shaft 3 tons conch where at the end of filling the required consistency for good dry conching is achieved. After 4 hours of further dry conching with a maximum temperature of 90° C., the mass is liquefied by addition of lecithin and cocoa butter whereafter in accordance with the recipe vanilla is added. The analysis of the viscosity gives a Casson viscosity of 1600 mPas and a Casson yield value of 5.8 Pa.

The analytical and taste results of this product are not significantly different from the reference production performed with the same raw materials and made on the standard process of 6 hours dry conching at the same temperature.

The invention claimed is:

1. Process for producing chocolate or a chocolate-like product comprising:
   (i) forming a first mixture comprising components of the chocolate or chocolate-like product;
   (ii) grinding the first mixture in first grinding means;
   (iii) forming a second mixture comprising components of the chocolate or chocolate-like product;
   (iv) grinding the second mixture in second grinding means different from the first grinding means;
   (v) combining the first and second mixtures to form a third mixture;
   (vi) homogenizing the third mixture with a fat; and
   (vii) conching the homogenized third mixture to form the chocolate or chocolate-like product.

2. Process according to claim 1, wherein the first grinding means comprises a roller refiner.

3. Process according to claim 2, wherein the roller refiner comprises a five roller refiner.

4. Process according to claim 1, wherein the second mixture is ground to a particle size of less than 80 μm.

5. Process according to claim 1, wherein the second grinding means comprises a classifier mill.

6. Process as claimed in claim 5, wherein the classifier mill is an air classifier mill.

7. Process according to claim 1, wherein the components are selected from the group consisting of cocoa materials, sugars, sugar substitutes, milk powders, fat and mixtures thereof.

8. Process according to claim 7, wherein the cocoa materials are selected from cocoa powder, cocoa mass, and mixtures thereof.

9. Process according to claim 7, wherein the milk powders are selected from skimmed milk powder, whey powder, derivatives of whey powder, full cream milk powder and mixtures thereof.

10. Process according to claim 7, wherein the sugars are selected from sucrose, fructose, glucose, dextrose and mixtures thereof.

11. Process according to claim 7, wherein the sugar substitutes are selected from inulin, dextrin, isomaltulose, polydextrose, maltitol and mixtures thereof.

12. Process according to claim 1, wherein the first mixture constitutes from 20 to 65% by weight of the chocolate or chocolate-like product.

13. Process according to claim 1, wherein the particle size of the second mixture is less than 50 μm.

14. Process according to claim 1, wherein the second mixture comprises at least 50% by weight of sugar, up to 5% by weight of milk powder and up to 5% by weight of cocoa material based on the total weight of the second mixture.

15. Process according to claim 1, wherein the level of fat present in the second mixture is less than 12% by weight by weight based on the total weight of the second mixture.

16. Process according to claim 1, wherein the third mixture is homogenized using a rotor/stator homogenizer.

17. Process according to claim 1, wherein the third mixture is homogenized such that a temperature rise of at least 10° C. is achieved in the mixture by mechanical input.

18. Process according to claim 1, wherein the homogenization is carried out to give a mixture with a hardness similar to the hardness resulting the shear from at least two hour of traditional conching in a double or single shaft conche.

19. Process according to claim 18, wherein the fat in the homogenizing step is selected from the group consisting of cocoa butter, cocoa butter equivalents, butter fat or fractions thereof, palm oil or fractions thereof, coconut or fractions thereof, palm kernel oil or fractions thereof, liquid vegetable oils, interesterified mixtures of the above fats or fractions or hardened components thereof, or mixtures thereof.

20. Process according to claim 1, wherein the conching is carried out using a three shaft shear conch or a one shaft plough shear conch.

21. Process according to claim 1, wherein the conching is carried out at temperature from 50 to 100° C.

22. Process according to claim 1, wherein the conching is carried out for less than 8 hours.

23. Process according to claim 1, wherein one or more components selected from fat, emulsifiers, flavouring agents and mixtures thereof are added to the mixture in the conch.

24. Process according to claim 23, wherein the fats that are added to the conch are selected from the group consisting of: cocoa butter, cocoa butter equivalents, butter fat or fractions thereof, palm oil or fractions thereof, coconut or fractions thereof, palm kernel oil or fractions thereof, liquid vegetable oils, interesterified mixtures of the above fats or fractions or hardened components thereof; and mixtures thereof.

25. Process according to claim 23, wherein the emulsifiers that are added to the conch are selected from the group consisting of lecithin, fractionated lecithin and PGPR or mixtures thereof.

26. Process according to claim 23, wherein the flavouring agents that are added to the conch are selected from the group consisting of vanilla and caramel or mixtures thereof.

27. Process according to claim 1, wherein the weight ratio of the fat in the first mixture to the fat in the second mixture is in the range of from 5:1 to 100:1.

28. Process according to claim 1, wherein the weight ratio of the (fat in the first mixture) : (the fat in the second mixture) : (the fat added after (iv)) is (40 to 60):(0.5 to 2):(40 to 60), based on the weight of the fat in the product of (vi).

* * * * *